United States Patent [19]
Schorr

[11] Patent Number: 5,528,688
[45] Date of Patent: Jun. 18, 1996

[54] TELEPHONE BATTERY FEED CIRCUIT INCLUDING NOISE REDUCTION CIRCUIT

[75] Inventor: Ian A. Schorr, Chicago, Ill.

[73] Assignee: AT&T Corp., Murray Hill, N.J.

[21] Appl. No.: 314,101

[22] Filed: Sep. 28, 1994

[51] Int. Cl.⁶ .................................................. H04M 19/00
[52] U.S. Cl. .................... 379/413; 379/377; 379/395; 379/382; 379/399
[58] Field of Search ............................ 379/377, 395, 379/382, 413, 399

[56] References Cited

U.S. PATENT DOCUMENTS

| | | | |
|---|---|---|---|
| 4,007,335 | 2/1977 | Hetherington et al. | 379/413 |
| 4,267,408 | 5/1981 | Schoofs | 379/413 |
| 4,306,122 | 12/1981 | Nijman et al. | 379/413 |
| 4,402,039 | 8/1983 | Jirka | 379/413 |
| 4,419,542 | 12/1983 | Embree et al. | 379/413 |
| 4,476,350 | 10/1984 | Aull et al. | 379/382 |
| 4,588,860 | 5/1986 | Ayano et al. | 379/413 |
| 4,612,417 | 9/1986 | Toumani | 379/413 |
| 4,736,415 | 4/1988 | McNeill et al. | 379/413 |
| 4,764,956 | 8/1988 | Rosch et al. | 379/413 |
| 5,337,354 | 8/1994 | Gadsby | 379/399 |
| 5,444,777 | 8/1995 | Condon et al. | 379/399 |

*Primary Examiner*—Jeffery Hofsass
*Assistant Examiner*—Scott Wolinsky
*Attorney, Agent, or Firm*—Charles L. Warren

[57] ABSTRACT

A circuit and method minimizes undesired noise signals associated with the battery utilized in a telephone battery feed circuit. In one embodiment, the noise voltage is amplified and inverted in phase and added back to a location on the ring line in order to provide substantial cancellation of the original noise voltage which would have appeared at the same location. In another embodiment, the noise voltage coupled to the ring line is reproduced as a replica signal. The replica signal is added in series with the tip line so as to provide equal phase and magnitude relationships relative to earth ground, thereby effectively canceling the noise current which would have flowed from the original noise source.

16 Claims, 2 Drawing Sheets

TELEPHONE BATTERY FEED CIRCUIT INCLUDING NOISE REDUCTION CIRCUIT

BACKGROUND OF THE INVENTION

The present invention is generally directed to circuits utilized to feed direct current to a telephone line. The invention is more specifically directed to the minimization of noise associated with battery feed circuits.

A variety of battery feed circuits have been utilized to provide direct current (DC) over tip and ring telephone lines to customer premises equipment. Typically, a bank of DC batteries have been connected to provide a source of direct current carried by telephone lines to subscriber equipment. In addition to supplying DC, it is the purpose of a battery feed circuit to appropriately couple the audio signals transmitted from central office equipment to a subscriber and from the subscriber to the central office equipment. Thus, the battery feed circuit must take into account the need to supply a DC current to customer premises equipment and the need to couple audio between the customer premises equipment and central office equipment.

It is desirable to minimize noise on subscriber lines in order to create a quiet background for the transmission and reception of a voice signal. Various attempts have been made to minimize common mode interference signals such as by the use of differential amplifiers. Examples of such techniques are described in U.S. Pat. Nos. 4,007,335, 4,476,350, and 4,612,417.

Although improvements have been made in battery feed circuits, relatively expensive filters using large capacitors and resistors connected to the battery are utilized to minimize noise associated with the DC battery. Battery noise filtering is specially important in passive battery feed circuits, using a transformer or resistors for providing a DC feed, because there are no other means of attenuating battery noise signal. Such noise may be transferred to the battery by equipment being utilized to maintain the charge of the battery or may be induced onto leads connecting the battery to the various battery feed circuits or caused by switching equipment. For example, an undesired, signal of 60 hertz induced by commercial AC power utilized in the United States may be a component of such noise.

The tip line is normally connected through a resistor to the positive terminal of the battery which is also coupled to an earth ground. The negative terminal of the battery is coupled through a resistor to the ring line. Thus, noise associated with the battery and the leads associated with the battery is not induced as a balanced common mode noise signal which is addressed by the circuitry in the above referenced patents. Therefore, such undesired, unbalanced signals remain a problem in battery feed circuits.

SUMMARY OF THE INVENTION

It is an object of the present invention to provide an improved battery feed circuit which addresses the problem of undesired noise as described above.

In accordance with one embodiment of the present invention, noise transferred by the negative terminal of the battery are sampled and comprise an input to an inverting amplifier. The output of the amplifier is coupled to the ring line which is also coupled to the negative terminal of the battery through a resistor. The gain applied to the sampled noise signal provided as an input to the amplifier is controlled so that the inverted amplified signal appearing at the ring line provides a substantially equal magnitude signal, but 180 degrees out of phase with the original noise signal. Thus, the phase inverted signal provides substantial cancellation of the noise which would have been induced by the battery onto the ring line.

In an alternative embodiment of the present invention, AC signals associated with the negative terminal of the battery are sampled and provided as an input to a non-inverting amplifier. The output of the amplifier provides a DC potential of ground and is utilized to drive the tip line through a resistor. Since any noise present at the negative terminal of the battery is applied directly through a resistor to the ring line, the replica noise signal, which is in phase with the original noise signal, is added in series with the tip line. This replica signal balances the undesired source of noise to substantially cancel the effects of the undesired signal by inhibiting noise current from flowing in the tip/ring circuit.

DETAILED DESCRIPTION

In accordance with the present invention, noise present at the negative terminal of the battery of a telephone battery feed circuit is transmitted to both the subscriber over the tip and ring telephone lines and transmitted to the other party connected by the central office equipment through the associated voice equipment which may include a CODEC. As used herein, "noise" refers to undesired alternating current (AC) signals which are present at the negative output of the battery.

Figure 1:
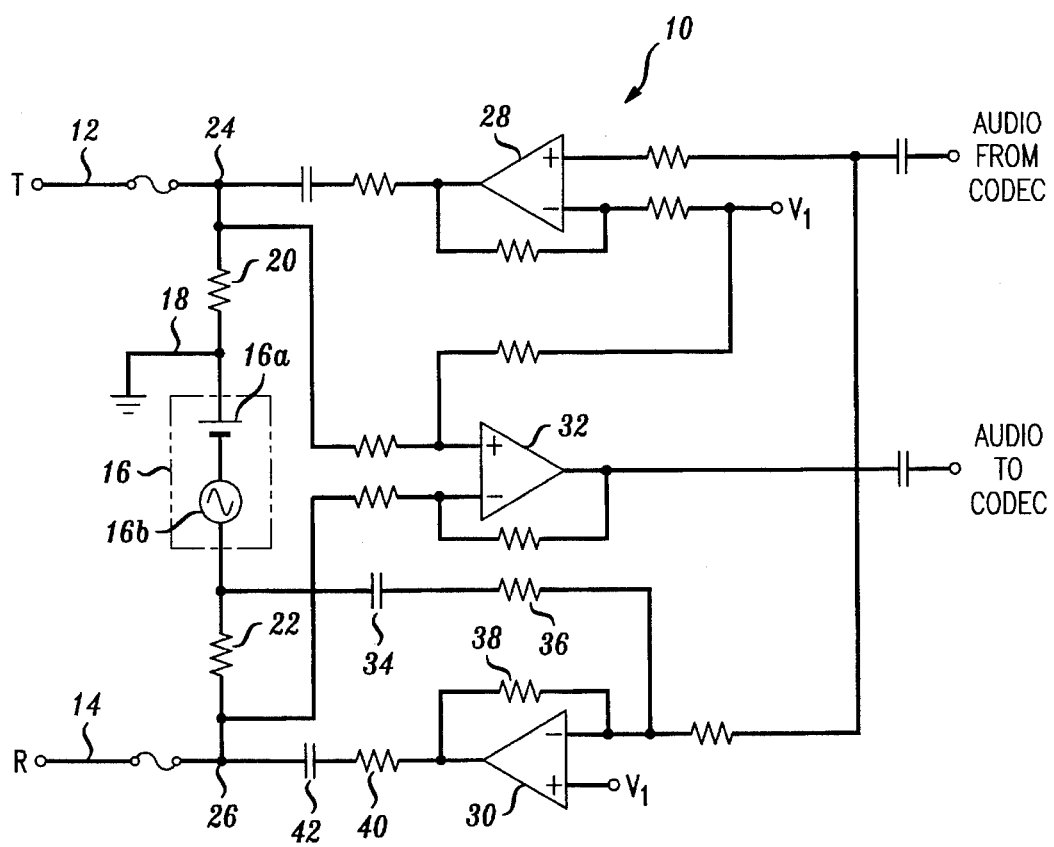
FIG. 1 illustrates a circuit diagram of an embodiment of a battery feed circuit in accordance with the present invention.

Referring to FIG. 1, a battery feed circuit 10 in accordance with an embodiment of the present invention supports tip and ring telephone lines 12 and 14, respectively. A battery system 16 is utilized to provide a source of DC current through the tip and ring lines for customer premises equipment. Ideally, the battery system would consist only of a DC battery 16a representing a constant source of DC voltage with extremely low internal impedance. However, the battery system 16 includes leads that are utilized to connect the battery to telephone equipment and also represents that the battery is non-ideal, e.g. the battery has a finite internal impedance. An AC voltage source 16b is shown in series with battery 16a as part of the battery system 16. The voltage source 16b represents the undesired noise which creates undesired currents on the tip and ring lines to the subscriber and will be transmitted through the central office equipment to the remote of the telephone connection.

The positive terminal of battery system 16 is connected to an earth ground 18. This terminal is also connected to a resistor 20 connected in series to the tip line 12. The negative terminal of battery system 16 is connected to resistor 22 which is connected in series with the ring line 14. The ends of resistors 20 and 22 opposite battery system 16 define connection points 24 and 26, respectively, to the tip and ring line 12 and 14.

Audio from a CODEC (not shown) to be transmitted to a subscriber is coupled by amplifiers 28 and 30 to locations 24 and 26, respectively, associated with the tip and ring lines. These amplifiers provide a differential source of audio with the un-inverted signal being supplied to location 24 and a 180 degree inverted signal being delivered to location 26. Audio from the subscriber to be delivered to the CODEC is differentially received across locations 24 and 26 by amplifier 32 which delivers the amplified audio to the CODEC. Reference voltage supply $V_1$ is equal to approximately one half the voltage of the DC battery system 16 and has been filtered to eliminate the noise voltage 16b of the battery system 16. This reference voltage is utilized to provide an operating bias point for the amplifiers and creates a reference voltage to be applied to the tip and ring lines.

In accordance with the present invention, AC signals appearing at the negative voltage output terminal of battery system 16 are sampled and provide an input signal coupled by capacitor 34 and resistor 36 to the inverting input of AC amplifier 30. Feedback resistor 38 coupled from the output of amplifier 30 to the inverting input in conjunction with resistor 36 defines the gain or amplification factor by which the sampled noise signals will be amplified by amplifier 30. The amplified and inverted noise signal is coupled from the output of amplifier 30 through series resistor 40 and coupling capacitor 42 to location 26 of the ring line 14. Preferably, the gain of amplifier 30 is set to a predetermined value such that the amplified and inverted signal coupled by the amplifier as appearing at point 26 will constitute a magnitude equal to the magnitude of the noise voltage coupled through resistor 22 to location 26. Thus, the out-of-phase voltage coupled by amplifier 30 with the in phase voltage coupled through resistor 22 provide for substantial cancellation at point 26 of the noise signal associated with battery system 16. Therefore, the noise voltage associated with the battery system is substantially minimized or canceled relative to the noise voltage which would have appeared on ring line 14 without the canceling action provided in accordance with an embodiment of the present invention.

It will be apparent to those skilled in the art that the equivalent AC impedance at location 26 of ring line 14 will be utilized in determining the gain to be provided by amplifier 30 in order to yield an inverted noise signal at location 26 equal in amplitude but opposite in phase to the noise signal which would have otherwise appeared at location 26 due to the represented signal source 16B. The relative value of resistor 22 and equivalent impedance at location 26 will determine the magnitude of the noise voltage derived from noise source 16b. Similarly, the magnitude of resistor 40 and the equivalent magnitude of the AC impedance at location 26 will define a voltage divider which must be taken into account in setting the gain of amplifier 30 so that the inverted noise signal appearing at location 26 will have an equal magnitude to the original noise signal at location 26. For ideal cancellation:

$$V_{16b} * \left[ \frac{R_{40}}{R_{22}+R_{40}} - \frac{R_{38}}{R_{36}} * \frac{R_{22}}{R_{22}+R_{40}} \right] = 0$$

where $V_{16b}$ is the noise voltage generated by source 16b and "R"s represent resistance values that correspond to the resistors identified by the subscripts in FIG. 1. Consequently, the following relationship should exist to facilitate noise cancellation:

$$\frac{R_{38}}{R_{36}} = \frac{R_{40}}{R_{22}}$$

Figure 2:
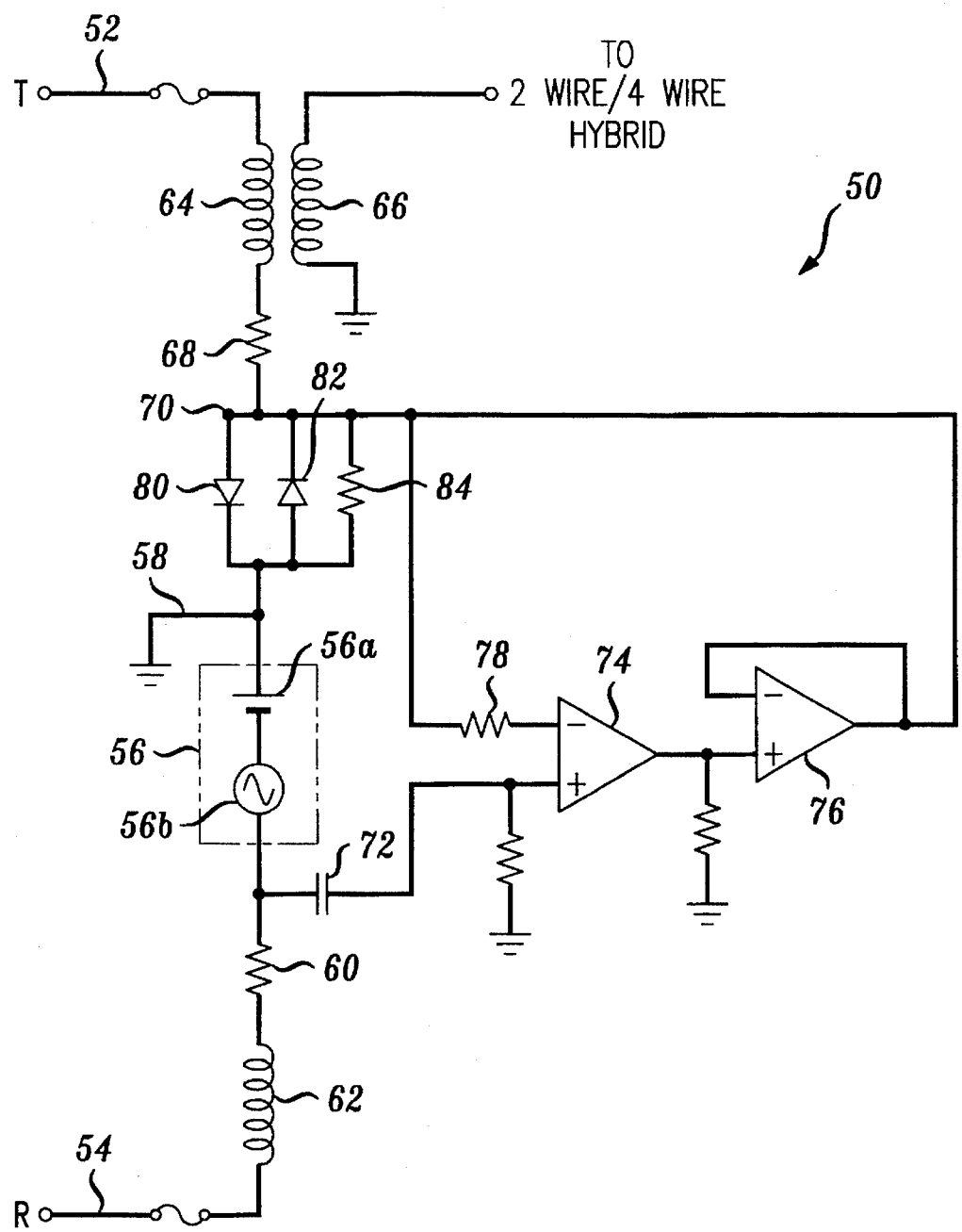
FIG. 2 illustrates a circuit diagram of an alternative embodiment of a battery feed circuit in accordance with the present invention.

FIG. 2 illustrates an alternative embodiment of a battery feed circuit 50 in accordance with the present invention. Tip and ring lines 52 and 54, respectively, provide telephone service to a subscriber. A battery system 56, represented by an ideal DC battery 56a in series with a noise source 56b, is utilized to supply DC current to the tip and ring lines. Battery system 56 is connected to the tip and ring lines 52 and 54 through the current limiting balanced resistors 68 and 60 and through the two halves of the primary winding 64 and 62 of a transformer. The positive terminal of the battery system 56 is connected to an earth ground 58. Analog voice signals are coupled to the tip and ring lines 52, 54 by primary windings 64, 62 of a transformer which includes a secondary winding 66 that is coupled to a two-wire to four-wire hybrid at the central office. Primary windings 62, 64 are balanced relative to earth ground 58. A resistor 68 in series with winding 64 is coupled to location (node) 70 which is a virtual ground, i.e. appears as a zero DC voltage relative to earth ground 58.

In accordance with an embodiment of the present invention, AC signals appearing at the negative terminal output of battery system 56 are sampled and coupled by capacitor 72 to the non-inverting input of amplifier 74. The output of the unity gain amplifier 74 is coupled to a buffer amplifier 76 which insures an extremely low output impedance reflected to node 70. The return feedback signal from the output of amplifier 76 through resistor 78 defines a gain of one for the amplifier 74, 76 combination for the noise signal received through capacitor 72. Thus, a noise signal coupled from battery system 56 to resistor 60 is also reflected through amplifier 74, 76 to appear at node 70 as connected to resistor 68. Relative to earth ground 58, AC noise voltages appear in phase and with equal magnitudes in series with resistors 60 and 68. Therefore, since equal voltages are applied to the tip and ring lines, no noise current associated therewith will flow through the tip and ring lines to the subscriber loop, and hence the noise signal associated with source 56b will not be induced in winding 66 in the transmit direction nor to the customer premises equipment connected to the tip and ring lines at the subscriber premises. As will be apparent to one skilled in the art, one also may consider the application of the law of superposition in considering that the noise currents will flow in equal but opposite directions therefore inducing voltages across circuit elements in the tip and ring lines resulting in a net zero voltage across such elements as an alternative way of viewing the cancellation. Thus, the noise which would have been present and would have resulted in undesired signals to the subscriber and to the two-wire/four-wire hybrid will be minimized and substantially eliminated in accordance with the subject embodiment of the present invention.

The back-to-back connected diodes 80 and 82 are normally not in conduction since the normal voltage across the diodes is less than the voltage required to begin conduction. These diodes provide overvoltage protection such as in the case of a power cross, static discharge, or induced voltage from a lightening strike. Resistor 84 in parallel with the diodes 80, 82 provides a high impedance reference point for node 70 to earth ground 58. It is the output of amplifier 76 at node 70 which provides the DC and AC drive to resistor 68 as coupled through winding 64 to tip line 52.

It will be apparent to those skilled in the art based upon these embodiments of the invention that alternative implementations may be constructed within the spirit of this invention. For example, it will be appreciated that all or a substantial part of the illustrative circuitry can be embodied in an integrated circuit which may incorporate other circuits associated with the telephone system. Although it is believed advantageous in the embodiment associated with FIG. 1 to utilize amplifier 30 for noise cancellation in addition to audio amplification, it will be apparent that these separate functions could be accomplished by separate amplifiers. It is believed that this invention is also useful for minimizing undesired signals in a digital system by using equivalent digital representations of the corresponding analog signals described in the illustrative embodiments. The digital system may transmit data as well as voice in digital format. In circumstances it may be desirable to reverse the tip and ring lines such that the ring line will connected to the earth ground. The buffer amplifier 76 in FIG. 2 can be implemented as a single transistor, may be integrated into amplifier 74, or may be eliminated if amplifier 74 has a sufficient output impedance characteristic and current driving capabilities.

Although embodiments of the present invention have been described above and shown in the drawings, the scope of the invention is defined by the claims which follow.

I claim:

1. A circuit for minimizing undesired alternating current (AC) signals such as noise associated with a battery that supplies direct current for a telephone line having tip and ring lines, the circuit comprising:

an amplifier that amplifies alternating current signals;

an output of the amplifier coupled to the ring line;

an input of the amplifier coupled to an output of the battery;

means for controlling the gain provided by the amplifier so that the undesired AC signals coupled to the input result in amplified signals with a predetermined magnitude and being substantially 180 degrees out of phase with the undesired AC signals;

means at a location on the ring line for summing said amplified signals and the undesired AC signals, the magnitude of the amplified signals at said location being substantially equal to the magnitude of the undesired AC signals at the location thereby resulting in a substantial cancellation of the undesired AC signals on the ring line.

2. The circuit according to claim 1 further comprising an input circuit connected to said input of the amplifier, the input circuit carrying an audio signal to be delivered to the ring line.

3. The circuit according to claim 2 further comprising means for determining the gain applied to said audio signal by the amplifier, said controlling means and determining means enabling the gains of the undesired AC signals and audio signal, respectively, to be independently predetermined.

4. The circuit according to claim 3 wherein said controlling means and determining means include a first resistor and second resistor, respectively, the first resistor coupling the undesired AC signals to said input of the amplifier and the second resistor coupling the audio signal to said input, the values of the first and second resistors affecting the gain applied by the amplifier to the undesired AC signals signal and audio signal, respectively.

5. A method for minimizing undesired alternating current (AC) signals such as noise associated with a battery that supplies direct current for a telephone line having tip and ring lines, the method comprising the steps of:

coupling the undesired AC signals appearing at an output of the battery to an input of an amplifier;

controlling the gain provided by the amplifier so that the undesired AC signals coupled to the input are transformed into amplified signals with a predetermined magnitude and being substantially 180 degrees out of phase with the undesired AC signals;

summing at a location on the ring line said amplified signals and the undesired AC signals, the magnitude of the amplified signals at said location being substantially equal to the magnitude of the undesired AC signals at the location thereby resulting in a substantial cancellation of the undesired alternating signals on the ring line.

6. The method according to claim 5 further comprising the step of coupling an audio signal to an input circuit connected to said input of the amplifier.

7. The method according to claim 6 further comprising the step of determining the gain applied to said audio signal by the amplifier, said controlling step and determining step enabling the gains of the undesired AC signals and audio signal, respectively, to be independently predetermined.

8. The method according to claim 7 wherein said controlling step and determining step include the use of a first resistor and second resistor, respectively, the first resistor coupling the undesired AC signals to said input of the amplifier and the second resistor coupling the audio signal to said input, the values of the first and second resistors affecting the gain applied by the amplifier to the undesired AC signals and audio signal, respectively.

9. A circuit for minimizing undesired alternating current (AC) signals such as noise associated with a battery that supplies direct current for a telephone line having tip and ring lines, the circuit comprising:

amplifier means for supplying a source of direct current from an output of the amplifier means to the tip line, said amplifier means presenting a virtual ground to the tip line;

means for coupling the undesired AC signals existing at an output of the battery to an input of said amplifier means, said amplifier means having an alternating current gain of approximately one and no substantial phase change for alternating signals at the output of the amplifier means relative to the alternating signals at its input;

said amplifier means inserting in series with the tip line a replica signal of the undesired AC signals with the replica signal having a magnitude substantially equal to the magnitude of the undesired alternating signals, the polarity of the replica signal being such that current induced by the replica signal flows in an opposite direction on the tip and ring lines relative to current induced by the undesired AC signals, thereby resulting in the substantial cancellation of current flow induced by the undesired AC signals on the tip and ring lines.

10. The circuit according to claim 9 further comprising means in series with the tip and ring lines for receiving voice signals from a user and transmitting voice signals to the user, whereby the undesired AC signals are substantially canceled and are not added to said voice signals.

11. A method for minimizing undesired alternating current (AC) signals such as noise associated with a battery that supplies direct current for a telephone line having tip and ring lines, the circuit comprising:

supplying a source of direct current from an output of an amplifier to the tip line, the amplifier presenting a virtual ground to the tip line;

coupling the undesired AC signals existing at an output of the battery to an input of the amplifier, the amplifier having an alternating current gain of approximately one and no substantial phase change for AC signals at the output of the amplifier means relative to the AC signals at its input;

the amplifier inserting in series with the tip line a replica signal of the undesired AC signals with the replica signal having a magnitude substantially equal to the magnitude of the undesired AC signals, the polarity of the replica signal being such that current associated with the replica signal flows in an opposite direction on the tip line relative to current induced by the undesired AC signals on the ring line, thereby resulting in the substantial cancellation of the undesired AC signals on the tip and ring lines.

12. The method according to claim 11 further comprising the steps of receiving voice signals from a user and transmitting voice signals to the user based on current flowing on the tip and ring lines, whereby the undesired AC signals are substantially canceled and are not added to said voice signals.

13. A circuit for minimizing an undesired signal, such as noise, associated with a telephone channel having tip and ring lines, the circuit comprising:

means for sampling the undesired signal;

means coupled to the sampling means for generating a cancellation signal based on the undesired signal, the generating means generating the cancellation signal representing a predetermined magnitude relative to the undesired signal and representing a phase that is substantially 180 degrees out of phase with the undesired signal;

means coupled to the generating means for summing said cancellation signal and the undesired signal at a location on one of the tip and ring lines, the magnitude of the cancellation signal at said location being substantially equal to the magnitude of the undesired signal at the location thereby resulting in a substantial cancellation of the undesired signal on said one line.

14. A method for minimizing undesired signals, such as noise, associated with a telephone channel having tip and ring lines, the method comprising the steps of:

sampling the undesired signal;

generating a cancellation signal based on the undesired signal, the cancellation signal representing a predetermined magnitude relative to the undesired signal and representing a phase that is substantially 180 degrees out of phase with the undesired signal;

summing said cancellation signal and the undesired signal at a location on one of the tip and ring lines, the magnitude of the cancellation signal at said location being substantially equal to the magnitude of the undesired signal at the location thereby resulting in a substantial cancellation of the undesired signal on said one line.

15. A circuit for minimizing an undesired signal, such as noise, associated with a telephone channel having tip and ring lines, the circuit comprising:

means for sampling the undesired signal on one of the tip and ring lines;

means coupled to the sampling means for generating a replica signal based on the undesired signal, the generating means generating the replica signal with a magnitude substantially equal to the undesired signal and with a phase that is substantially equal to the phase of the undesired signal;

means coupled to the generating means for inserting the replica signal on the other of the tip and ring lines, the inserted replica signal inducing a current to flow in a direction opposite to undesired signal current flowing in the other of the tip and ring lines thereby resulting in a substantial cancellation of the undesired signal on said telephone channel.

16. A method for minimizing undesired signals, such as noise, associated with a telephone channel having tip and ring lines, the method comprising the steps of:

sampling the undesired signal on one of the tip and ring lines;

generating a replica signal based on the undesired signal, the replica signal having a magnitude substantially equal to the undesired signal and having a phase that is substantially equal to the phase of the undesired signal;

inserting the replica signal on the other of the tip and ring lines, the replica signal inducing a current to flow in a direction opposite to undesired signal current flowing in the other of the tip and ring lines, thereby resulting in a substantial cancellation of the undesired signal on said telephone channel.

* * * * *